(12) United States Patent
Kim et al.

(10) Patent No.: US 7,781,952 B2
(45) Date of Patent: Aug. 24, 2010

(54) GREEN PHOSPHOR FOR PLASMA DISPLAY PANEL AND PLASMA DISPLAY PANEL INCLUDING PHOSPHOR LAYER FORMED OF THE GREEN PHOSPHOR

(75) Inventors: Young-Kwan Kim, Suwon-si (KR); Seung-Uk Kwon, Suwn-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 601 days.

(21) Appl. No.: 11/730,133

(22) Filed: Mar. 29, 2007

(65) Prior Publication Data

US 2007/0228969 A1   Oct. 4, 2007

(30) Foreign Application Priority Data

Mar. 29, 2006   (KR) .................... 10-2006-0028399

(51) Int. Cl.
 *H01J 17/49* (2006.01)
(52) U.S. Cl. ................. 313/486; 313/582; 313/484; 445/24
(58) Field of Classification Search .............. None
 See application file for complete search history.

(56) References Cited

U.S. PATENT DOCUMENTS

| 6,743,378 B2 * | 6/2004 | Kawamura ........... 252/301.4 R |
| 7,358,668 B2 * | 4/2008 | Kwon .................. 313/582 |
| 2002/0089284 A1 * | 7/2002 | Hayashi ............... 313/582 |
| 2003/0137234 A1 * | 7/2003 | Aoki et al. ........... 313/486 |

FOREIGN PATENT DOCUMENTS

| JP | 09-219154 | | 8/1997 |
| KR | 20000060401 A | * | 10/2000 |
| KR | 2001-0031871 | | 4/2001 |
| KR | 1020010062387 | | 7/2001 |

OTHER PUBLICATIONS

Machine English translation of KR 20000060401 to Kim et al.*
Machine English translation of KR20000060401 to Kim et al. Oct. 16, 2000.*
Korean Office Action issued by Korean Intellectual Property Office on May 28, 2009 for Applicant's priority document: KR 2006-0028399.

* cited by examiner

*Primary Examiner*—Sikha Roy
(74) *Attorney, Agent, or Firm*—Robert E. Bushnell, Esq.

(57) ABSTRACT

Provided is a green phosphor for a plasma display panel (PDP), represented by the formula: $BaMgAl_xO_y$:Mn where $7 < x < 15$, and $12 < y < 28$. A phosphor layer can be prepared using $BaMgAl_xO_y$:Mn alone, which is a green phosphor used in a plasma display panel, or using a mixture of $BaMgAl_xO_y$:Mn and $Zn_2SiO_4$:Mn, and a plasma display panel including the phosphor layer formed of the green phosphor has improved luminance maintenance rate and color purity.

18 Claims, 1 Drawing Sheet

GREEN PHOSPHOR FOR PLASMA DISPLAY PANEL AND PLASMA DISPLAY PANEL INCLUDING PHOSPHOR LAYER FORMED OF THE GREEN PHOSPHOR

CLAIM OF PRIORITY

This application makes reference to, incorporates the same herein, and claims all benefits accruing under 35 U.S.C. §119 from an application for GREEN PHOSPHOR FOR PLASMA DISPLAY PANEL AND PLASMA DISPLAY PANEL INCLUDING PHOSPHOR LAYER FORMED OF THE GREEN PHOSPHOR earlier filed in the Korean Intellectual Property Office on the 29$^{th}$ day of Mar. 2006 and there duly assigned Ser. No. 10-2006-0028399.

BACKGROUND OF THE INVENTION

1. Technical Field

The present invention relates to a green phosphor used in a plasma display panel (PDP) and a PDP including a phosphor layer formed of the green phosphor having improved luminance maintenance rate and color purity.

2. Related Art

Phosphors emit light when they are exposed to energy. Phosphors are used in light sources such as mercury fluorescent lamps or mercury free fluorescent lamps, electron emission devices, plasma display panels (PDPs), etc. In the future, phosphors will be used for a wider range of applications, as new multimedia devices are developed.

Plasma display panels (PDPs) are flat panel displays that display images using light emitted by ultraviolet rays that are created by discharge of a mixture of gases comprising neon and xenon injected into an area between a pair of glass substrates. At this point, visible light is created by each phosphor using resonance radiation light of Xe ion (147 nm vacuum ultra violet).

Phosphors for PDPs require good discharge characteristics, a high light emission luminance, good color coordinates and a short decay time. In PDPs, the composition of a material formed of a phosphor layer is different according to the colors of the phosphor layer, that is, red, green and blue, and surface discharge characteristics are different according to the type of material. When the surface of the material is positively discharged, there is a low probability of discharge failure. On the other hand, when the surface of the material is negatively discharged, there is a high probability of discharge failure. Such a probability of discharge failure is largely related to the driving method of PDPs. However, in order to increase discharge stability of PDPs and reduce the discharge failure rate thereof, red, green and blue phosphors having a positively discharged surface may be selected.

$Zn_2SiO_4$:Mn, which is a green phosphor that is commonly used in PDPs, has a negatively discharged surface. To address the problem described above, Korean Patent Publication No. 2001-0062387 discloses a green phosphor prepared by mixing $Zn_2SiO_4$:Mn and $YBO_3$:Tb. However, the green phosphor disclosed in Korean Patent Publication No. 2001-0062387 has reduced color purity. Therefore, a phosphor prepared by mixing $Zn_2SiO_4$:Mn with $(Ba,Sr,Mg)O.aAl_2O_3$:Mn has been used to improve color purity of the phosphor. However, when the phosphor prepared using the above-described processes is used in a PDP, the lifetime of the PDP is significantly decreased.

SUMMARY OF THE INVENTION

The present invention provides a green phosphor which can be used in a plasma display panel (PDP), and which has high color purity and a high luminance maintenance rate.

The present invention also provides a method of manufacturing a plasma display panel including a phosphor layer formed of the green phosphor having improved color purity and luminance maintenance rate.

The present invention also provides a plasma display panel including a phosphor layer formed of a green phosphor having improved color purity.

According to an aspect of the present invention, a green phosphor for a plasma display panel is represented by Formula 1 below:

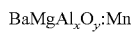:Mn    Formula 1 where $7<x<15$, and $12<y<28$.

According to another aspect of the present invention, a green phosphor for a plasma display panel comprises: a phosphor represented by Formula 1 below; and $Zn_2SiO_4$:Mn:

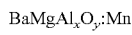:Mn    Formula 1 where $7<x<15$, and $12<y<28$.

According to another aspect of the present invention, a method of manufacturing a plasma display panel (PDP) comprises the steps of: forming a plurality of discharge rooms between a front panel and a rear panel which are opposite to each other; and printing, drying and sintering a paste composition comprising the green phosphor, a solvent and a resin binder in each of the discharge rooms to form a green phosphor layer in each of the discharge rooms.

According to another aspect of the present invention, a plasma display panel comprises: a transparent front substrate; a rear substrate which is parallel to the transparent front substrate; light-emitting cells defined by barrier ribs formed between the transparent front substrate and the rear substrate; a plurality of pairs of sustain electrodes extending in a first direction so as to correspond to the light-emitting cells; a plurality of address electrodes extending in a second direction perpendicular to the first direction so as to correspond to the light-emitting cells; a rear dielectric layer covering the address electrodes; red, green and blue phosphor layers disposed inside the light-emitting cells; a front dielectric layer covering the pairs of sustain electrodes; and a discharge gas filled inside the light-emitting cells; wherein the green phosphor layer is formed of the green phosphor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
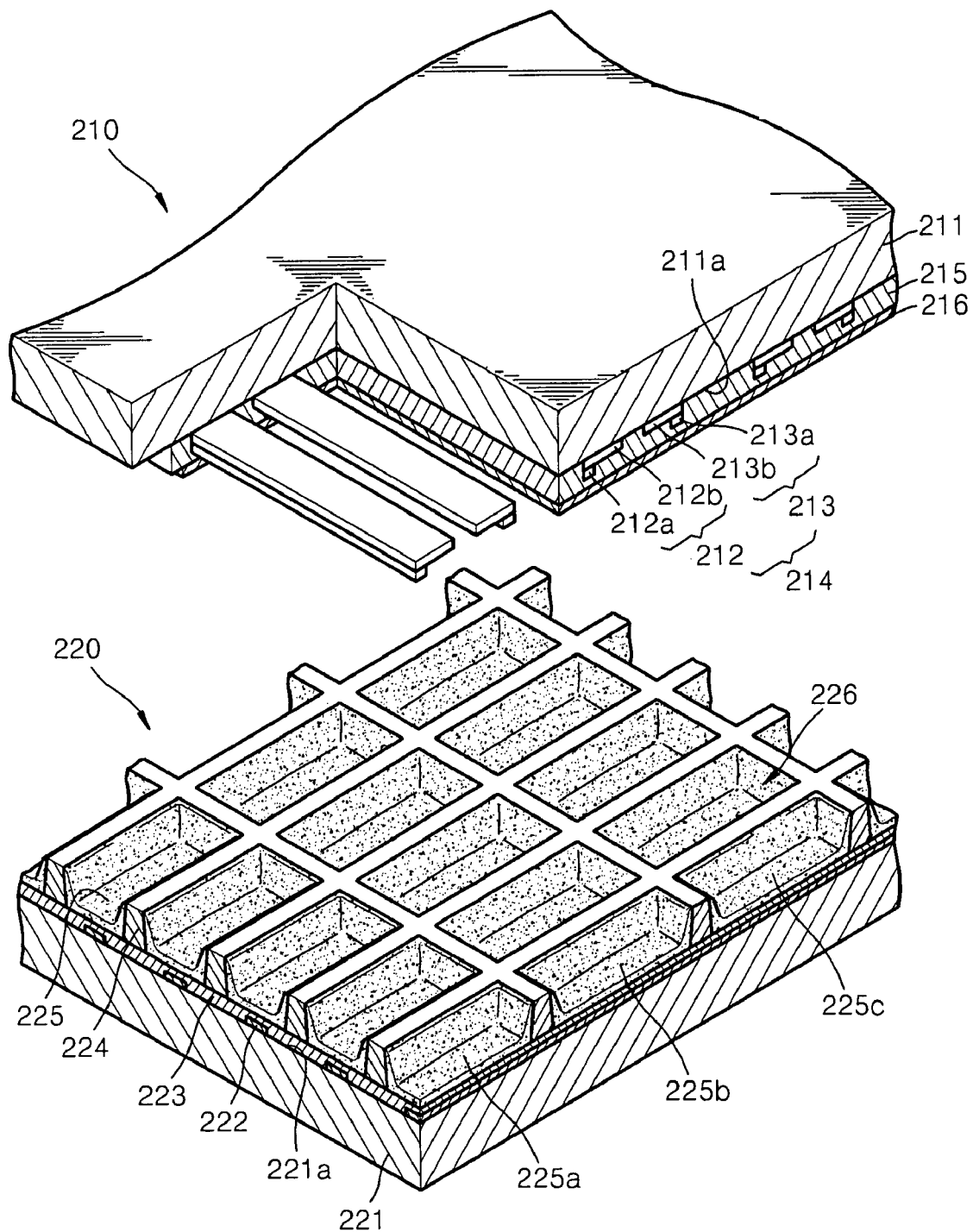
FIG. 1 is a perspective view illustrating a plasma display panel according to an embodiment of the present invention.

The present invention will now be described more fully with reference to FIG. 1.

The present invention relates to a green phosphor used in a plasma display panel (PDP). In particular, the present invention provides a green phosphor represented by Formula 1 below which can be used in a plasma display panel according to an embodiment of the present invention:

$$BaMgAl_xO_y:Mn \quad \text{Formula 1}$$

where $7<x<15$, and $12<y<28$.

(Ba, Sr, Mg)O.aAl$_2$O$_3$:Mn is a phosphor used to improve color purity in plasma display panels. However, such a phosphor has a lower luminance maintenance rate than that of other green phosphors. Therefore, the green phosphor represented by Formula 1, which does not contain Sr, is used to improve the luminance maintenance rate of plasma display panels.

In the green phosphor according to the current embodiment of the present invention, Mn is used as an activator, wherein the amount of Mn may be 0.1-27 mole %, preferably 1-15 mole %. When the amount of Mn is less than 0.1 mole %, the green phosphor has low luminance. When the amount of Mn is greater than 27 mole %, luminance of the phosphor is further decreased. In theory, the larger the amount of the activator, the higher the luminance of the green phosphor. However, when the amount of the activator is excessive, luminance of the green phosphor then decreases in a process in which activators exchange electrons or light each other.

In the current embodiment of the present invention, the green phosphor may comprise spherical particles having a diameter of 0.1-2 μm.

According to another embodiment of the present invention, there is provided a green phosphor used in a plasma display panel comprising: a phosphor represented by Formula 1 below; and Zn$_2$SiO$_4$:Mn:

$$BaMgAl_xO_y:Mn \quad \text{Formula 1}$$

where $7<x<15$, and $12<y<28$.

Zn$_2$SiO$_4$:Mn, which constitutes the main constituent, is mixed with BaMgAl$_x$O$_y$:Mn to obtain a green phosphor which can be used in a PDP according to an embodiment of the present invention. Thus, a PDP using the green phosphor according to the current embodiment of the present invention can have an improved luminance maintenance rate. Since BaMgAl$_x$O$_y$:Mn has less advantages than Zn$_2$SiO$_4$:Mn in terms of luminance, afterglow characteristic and/or lifetime, Zn$_2$SiO$_4$:Mn is used as the main constituent. Therefore, a green phosphor with improved properties, and which can be used in a PDP, can be manufactured.

The amount of the phosphor represented by Formula 1 may be 1-50 weight % based on the total amount of the green phosphor according to the current embodiment of the present invention.

The amount of Mn may be 0.1-27 mole % based on 100 mole % of the phosphor represented by Formula 1.

The phosphor BaMgAl$_x$O$_y$:Mn according to the invention, or the phosphor according to the invention and the phosphor Zn$_2$SiO$_4$:Mn, are mixed with a resin binder, an organic solvent and the like to prepare a paste composition. The prepared paste composition is printed, dried and sintered to form a phosphor layer.

A PDP including a phosphor layer formed of the phosphor according to the invention will now be described in detail.

The PDP according to an embodiment of the present invention comprises: a transparent front substrate; a rear substrate which is parallel to the transparent front substrate; light-emitting cells divided by barrier ribs disposed between the transparent front substrate and the rear substrate; address electrodes extending in a first direction so as to correspond to light-emitting cells; a rear dielectric layer covering the address electrodes; red, green and blue phosphor layers disposed inside the light-emitting cells; pairs of sustain electrodes extending in a second direction and crossing the address electrodes; a front dielectric layer covering the pairs of sustain electrodes; and a discharge gas filled inside the light-emitting cells; wherein the green phosphor is prepared using BaMgAl$_x$O$_y$:Mn alone where $7<x<15$ and $12<y<28$, or a mixture of BaMgAl$_x$O$_y$:Mn where $7<x<15$ and $12<y<28$ and Zn$_2$SiO$_4$:Mn.

The PDP having this structure will now be described in detail with reference to FIG. 1.

FIG. 1 is a perspective view illustrating a PDP according to an embodiment of the present invention. Referring to FIG. 1, the PDP includes a front panel 210 and a rear panel 220.

The front panel 210 includes a front substrate 211, a plurality of pairs of sustain electrodes 214 which are disposed on a bottom surface 211a of the front substrate 211 and which extend in a first direction so as to correspond to light-emitting cells 226, a front dielectric layer 215 covering the pairs of sustain electrodes 214, and a protective layer 216.

The rear panel 220 includes: a rear substrate 221 which is parallel to the front substrate 211; address electrodes 222 which are disposed on a front surface 221a of the rear substrate 221 and which extend in a second direction perpendicular to the first direction so as to cross the pairs of sustain electrodes 214; a rear dielectric layer 223 covering the address electrodes 222; barrier ribs 224 which are formed between the front substrate 211 and the rear substrate 221, wherein the barrier ribs 224 are disposed on the rear dielectric layer 223, and define the light-emitting cells 226; and red phosphor layers 225a, green phosphor layers 225b, and blue phosphor layers 225c, respectively formed of red phosphor, green phosphor, and blue phosphor which emit visible rays as a result of being excited by ultraviolet rays emitted from a discharge gas generated due to sustain discharges occurring inside the light-emitting cells 226.

According to an embodiment of the present invention, the green phosphor layers 225b can be formed of a phosphor including BaMgAl$_x$O$_y$:Mn. To easily print the phosphor according to the current embodiment of the present invention, the phosphor is mixed with a binder and a solvent to obtain a paste phase composition, and then the paste phase composition is screen printed using a screen mesh. Then, the printed composition is dried and sintered to form a phosphor layer. The drying temperature of the printed composition may be in the range of 100-150° C., and the sintering temperature may be in the range of 350-600° C., preferably about 450° C., to remove organic materials of the paste phase composition. The binder can be ethyl cellulose or acryl resin, and the amount of the binder may be in the range of 10-30 parts by weight based on 100 parts by weight of the phosphor. When the amount of the binder is less than 10 parts by weight based on 100 parts by weight of the phosphor, the binding force of the phosphor layer may decrease. On the other hand, when the amount of the binder is greater than 30 parts by weight based on 100 parts by weight of the phosphor, the amount of the phosphor in the green phosphor layers 225b is relatively low, and thus color purity of the green phosphor layers 225b may decrease.

The solvent can be butyl carbitol (BCA) or terpineol, and the amount of the solvent may be in the range of 70-300 parts by weight based on 100 parts by weight of the phosphor. When the amount of the solvent is less than 70 parts by weight based on 100 parts by weight of the phosphor, the phosphor is insufficiently dispersed or the viscosity of the paste phase composition is so high that printing is difficult. On the other hand, when the amount of the solvent is greater than 300 parts by weight based on 100 parts by weight of the phosphor, the amount of phosphor per unit area is too low, and thus luminance of the PDP decreases.

The viscosity of the paste phase composition may be in the range of 5,000-50,000 cps, but preferably 20,000 cps. When the viscosity of the paste phase composition is less than 5,000 cps, the printing solution may leak out to adjacent light-emitting cells 226 during the printing process, thus making it difficult to precisely form a printed layer at a desired location. On the other hand, when the viscosity of the paste phase composition is greater than 50,000 cps, it is unsuitable for printing.

The paste phase composition according to the current embodiment of the present invention can, if necessary, further include additives such as a dispersant, a plasticizer, an anti-oxidant, a leveler or the like. In addition, all of the above additives are known to those of ordinary skill in the art. The amount of the additives may be 0.1-10 parts by weight based on a total amount of the paste phase composition.

The green phosphor layers 225b can be formed of a phosphor including $BaMgAl_xO_y$:Mn according to the current embodiment of the present invention. The red and blue phosphor layers can be any red and blue phosphor layers that are conventionally used in the process of manufacturing a PDP.

In general, the front substrate 211 and the rear substrate 221 are formed of glass. The front substrate 211 may have high light transmittance.

The address electrodes 222, which are disposed on the front surface 221a of the rear substrate 221 and which extend in the second direction so as to correspond to the light-emitting cells 226, may be formed of a metal having high electrical conductivity, such as Al. The address electrodes 222 are used together with a Y 212 electrode to be later described to generate an address discharge in selected light-emitting cells 226 which are to emit light. In the selected light-emitting cells 226 in which address discharge has occurred, a sustain discharge can subsequently occur.

The address electrodes 222 are covered by the rear dielectric layer 223, which prevents collision of the address electrodes 222 with charged particles which are generated during the address discharge, so that the address electrodes 222 can be protected. The rear dielectric layer 223 may be formed of a dielectric material capable of inducing discharged particles. The dielectric material can be PbO, $B_2O_3$, $SiO_2$, or the like.

The barrier ribs 224 defining the light-emitting cells 226 are formed between the front substrate 211 and the rear substrate 221. The barrier ribs 224 secure a discharge space between the front substrate 211 and the rear substrate 221, prevent crosstalk between adjacent light-emitting cells 226, and enlarge the surface area of a phosphor layer 225. The barrier ribs 224 may be formed of a glass material including Pb, B, Si, Al, or O, and when required, the barrier ribs 224 may further include a filler, such as $ZrO_2$, $TiO_2$, and $Al_2O_3$, and a pigment, such as Cr, Cu, Co, Fe, or $TiO_2$.

The pairs of sustain electrodes 214 extend in the first direction so as to correspond to the emission cells 226, the first direction being perpendicular to the second direction in which the address electrodes 222 extend. Each of the pairs of sustain electrodes 214 includes an X electrode 213 and a Y electrode 212 which cause sustain discharge. The pairs of sustain electrodes 214 are disposed parallel to each other at predetermined intervals on the bottom surface 211a of the front substrate 211. The sustain discharge occurs due to a potential difference between the X electrodes 213 and the Y electrodes 212.

The X electrodes 213 and the Y electrodes 212 include transparent electrodes 213b and 212b and bus electrodes 213a and 212a, respectively. In some cases, however, the bus electrodes 213a and 212a can be solely used to form a scanning electrode and a common electrode.

The transparent electrodes 213b and 212b may be formed of a conductive and transparent material, so that the light emitted from the phosphor can be transmitted toward the front substrate 211 without being blocked. The conductive and transparent material used to form the transparent electrodes 213b and 212b can be indium tin oxide (ITO). However, since the conductive and transparent material, such as ITO, has a high resistance, when the sustain electrodes 214 are only formed of the transparent electrodes 213b and 212b, the sustain electrodes 214 have a large voltage drop in a lengthwise direction of the transparent electrodes 213b and 212b, the power consumption of the PDP increases, and the response speed of images reduces. In order to prevent these problems, the bus electrodes 213a and 212a are formed of a highly conductive metal, such as Ag, and are formed on outer surfaces of the transparent electrodes 213b and 212b.

The X and Y electrodes 213 and 212, respectively, are covered by the front dielectric layer 215. The front dielectric layer 215 electrically insulates the X electrodes 213 from the Y electrodes 212, and prevents collisions of charged particles with the X and Y electrodes 213 and 212, respectively, so that the sustain electrodes 214 are protected. The front dielectric layer 215 is formed of a dielectric material having high light transmittance, such as PbO, $B_2O_3$, $SiO_2$, or the like.

The protective layer 216 can be formed on the front dielectric layer 215. The front dielectric layer 215 prevents collisions of charged particles with the X and Y electrodes 213 and 212, respectively, during the sustain discharge so that the front dielectric layer 215 can be protected, and generates many secondary electrons during the sustain discharge. The protective layer 216 may be formed of MgO.

The discharge cells 226 are filled with a discharge gas. The discharge gas can be, for example, a gaseous mixture of Ne and Xe in which the amount of Xe is in the range of 5%-10%. When needed, a part of Ne can be replaced with He.

The present invention will be described in further detail with reference to the following Examples and Comparative Examples. These examples are for illustrative purposes only and are not intended to limit the scope of the present invention.

EXAMPLES

Example 1

100 weight % of $BaMgAl_{10}O_{17}$:Mn (Mn 10 mole %) was mixed with a vehicle prepared by mixing butyl carbitol acetate and ethyl cellulose to prepare a paste composition. The prepared paste composition was printed on barrier ribs of a plasma display panel to prepare a green phosphor layer. Using the green phosphor layer, a PDP was manufactured.

Example 2

A green phosphor layer was prepared in the same manner as in Example 1, except that 10 weight % of $BaMgAl_{10}O_{17}$:Mn and 90 weight % of $Zn_2SiO_4$:Mn were used.

Example 3

A green phosphor layer was prepared in the same manner as in Example 1, except that 25 weight % of $BaMgAl_{10}O_{17}$:Mn and 75 weight % of $Zn_2SiO_4$:Mn were used.

Example 4

A green phosphor layer was prepared in the same manner as in Example 1, except that 50 weight % of $BaMgAl_{10}O_{17}$:Mn and 50 weight % of $Zn_2SiO_4$:Mn were used.

Example 5

The accelerated lifetime maintenance rate was measured by changing the accelerated time of the plasma display panel of Example 1 at 100 hours, 500 hours and 1,000 hours, respectively.

Comparative Example 1

A green phosphor layer was prepared in the same manner as in Example 1, except that 100 weight % of $Zn_2SiO_4$:Mn was used alone without using $BaMgAl_{10}O_{17}$:Mn.

Comparative Example 2

A green phosphor layer was prepared in the same manner as in Example 5, except that 100 weight % of (Ba,Sr,Mg)O.aAl$_2$O$_3$:Mn was used alone without using $BaMgAl_{10}O_{17}$:Mn.

Properties of Example 1 thru 5 and Comparative Examples 1 and 2 are shown in Tables 1 and 2:

TABLE 1

| No. | Color coordinate (x) | Color coordinate (y) | Accelerated lifetime (500 hours) | Afterglow time | Luminance |
|---|---|---|---|---|---|
| Example 1 | 0.147 | 0.740 | 84 | 14 | 88 |
| Example 2 | 0.237 | 0.708 | 89 | 9.5 | 99 |
| Example 3 | 0.223 | 0.713 | 88 | 10.2 | 97 |
| Example 4 | 0.200 | 0.721 | 86 | 11.5 | 94 |
| Comparative Example 1 | 0.245 | 0.705 | 90 | 9 | 100 |

Referring to Table 1, it can be seen that the green phosphor layers of Examples 1 thru 4 have excellent color purity, in spite of having slightly less luminance and shorter accelerated lifetime, compared with the green phosphor layer of Comparative Example 1 prepared using 100 weight % of $Zn_2SiO_4$:Mn alone. From the results, it can be seen that afterglow time can be reduced or luminance can be improved by appropriately adjusting the mixing ratio of $BaMgAl_{10}O_{17}$:Mn and $Zn_2SiO_4$:Mn.

TABLE 2

| | Accelerated lifetime (%) | | |
|---|---|---|---|
| | 100 hours | 500 hours | 1,000 hours |
| Example 5 | 91 | 84 | 81 |
| Comparative Example 2 | 80 | 71 | 65 |

Referring to Table 2, it can be seen that $BaMgAl_{10}O_{17}$:Mn which forms a green phosphor used in a plasma display panel, which does not include Sr, has improved accelerated lifetime compared with BaSrMgAl$_2$O$_3$:Mn which includes Sr.

A plasma display panel including a phosphor layer formed of the green phosphor according to the present invention prepared using $BaMgAl_xO_y$:Mn alone, or using a mixture of $BaMgAl_xO_y$:Mn and $Zn_2SiO_4$:Mn, can have improved color purity and luminance maintenance rate.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A green phosphor for a plasma display panel (PDP), comprising a compound represented by the following formula:

$BaMgAl_xO_y$:Mn 

where $7<x<15$, and $12<y<28$ wherein the amount of Mn is 0.1-27 mole% based on 100 mole% of the green phosphor.

2. The green phosphor of claim 1, wherein the amount of Mn is 1-15 mole% based on 100 mole% of the green phosphor.

3. The green phosphor of claim 1, comprising spherical particles having a diameter of 0.1-2 μm.

4. A green phosphor for a plasma display panel (PDP), comprising:

a phosphor and $Zn_2SiO_4$:Mn, wherein the phosphor is represented by the following formula:

$BaMgAl_xO_y$:Mn 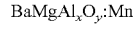

where $7<x<15$, and $12<y<28$ wherein the amount of Mn is 0.1-27 mole% based on 100 mole% of the phosphor represented by the formula.

5. The green phosphor of claim 4, wherein the amount of the phosphor represented by the formula is 1-50 weight% based on a total amount of the green phosphor.

6. The green phosphor of claim 4, comprising spherical particles having a diameter of 0.1-2 μm.

7. A method of manufacturing a plasma display panel (PDP), comprising the steps of:

forming a plurality of discharge rooms between a front panel and a rear panel which are parallel to each other; and printing, drying and sintering a paste composition comprising a green phosphor, a solvent and a resin binder in each of the discharge rooms to form a green phosphor layer in each of the discharge rooms;

wherein the green phosphor is represented by the following formula:

$BaMgAl_xO_y$:Mn 

where $7<x<15$, and $12<y<28$ wherein the amount of Mn is 0.1-27 mole% based on 100 mole% of the green phosphor.

8. The method of claim 7, wherein the resin binder is one of ethyl cellulose and acryl resin.

9. The method of claim 7, wherein the amount of Mn is 1-15 mole% based on 100 mole% of the green phosphor.

10. The method of claim 7, comprising spherical particles having a diameter of 0.1-2 μm.

11. A plasma display panel, comprising:

a transparent front substrate;

a rear substrate which is parallel to the transparent front substrate;

light-emitting cells defined by barrier ribs formed between the transparent front substrate and the rear substrate;

a plurality of pairs of sustain electrodes extending in a first direction so as to correspond to the light-emitting cells;

a plurality of address electrodes extending in a second direction perpendicular to the first direction so as to correspond to the light-emitting cells;

a rear dielectric layer covering the address electrodes;
red, green and blue phosphor layers disposed inside the light-emitting cells;
a front dielectric layer covering the pairs of sustain electrodes; and
a discharge gas filled inside the light-emitting cells;
wherein the green phosphor layer comprises a green phosphor represented by the following formula:

$$BaMgAl_xO_y:Mn$$

where $7<x<15$, and $12<y<28$ wherein the amount of Mn is 0.1-27 mole% based on 100 mole% of the green phosphor.

12. The plasma display panel of claim 11, wherein the amount of Mn is 1-15 mole% based on 100 mole% of the green phosphor.

13. The plasma display panel of claim 11, comprising spherical particles having a diameter of 0.1-2 μm.

14. The plasma display panel of claim 11, wherein the green phosphor layer has a thickness of 5-50 μm.

15. A plasma display panel, comprising:
a transparent front substrate;
a rear substrate which is parallel to the transparent front substrate;
light-emitting cells defined by barrier ribs formed between the transparent front substrate and the rear substrate;
a plurality of pairs of sustain electrodes extending in a first direction to correspond to the light-emitting cells;
a plurality of address electrodes extending in a second direction perpendicular to the first direction so as to correspond to the light-emitting cells;
a rear dielectric layer covering the address electrodes;
red, green and blue phosphor layers disposed inside the light-emitting cells;
a front dielectric layer covering the pairs of sustain electrodes; and
a discharge gas filled inside the light-emitting cells;
wherein the green phosphor layer comprises a phosphor and $Zn_2SiO_4:Mn$, and wherein the phosphor is represented by the following formula:

$$BaMgAl_xO_y:Mn$$

where $7<x<15$, and $12<y<28$ wherein the amount of Mn is 0.1-27 mole% based on 100 mole% of the phosphor re reseted by the formula.

16. The plasma display panel of claim 15, wherein the amount of the phosphor represented by the formula is 1-50 weight% based on a total amount of the green phosphor.

17. The plasma display panel of claim 15, comprising spherical particles having a diameter of 0.1-2 μm.

18. The plasma display panel of claim 15, wherein the green phosphor layer has a thickness of 5-50 μm.

* * * * *